US012148581B1

(12) United States Patent
Shi

(10) Patent No.: US 12,148,581 B1
(45) Date of Patent: Nov. 19, 2024

(54) DUAL-PURPOSE INFLATOR PUMP

(71) Applicant: Dongguan Hongyu Plastic Co., Ltd., Guangdong (CN)

(72) Inventor: Juying Shi, Guangdong (CN)

(73) Assignee: Dongguan Hongyu Plastic Co., Ltd., Guangdong (CN)

( * ) Notice: Subject to any disclaimer, the term of this patent is extended or adjusted under 35 U.S.C. 154(b) by 0 days.

(21) Appl. No.: 18/402,145

(22) Filed: Jan. 2, 2024

(30) Foreign Application Priority Data

Dec. 9, 2023 (CN) ......................... 202323360180.8

(51) Int. Cl.
*F04D 29/40* (2006.01)
*F04D 29/60* (2006.01)
*H01H 13/20* (2006.01)

(52) U.S. Cl.
CPC ........... *H01H 13/20* (2013.01); *F04D 29/403* (2013.01); *F04D 29/601* (2013.01)

(58) Field of Classification Search
CPC .... F04D 25/084; F04D 29/601; F04D 29/503; F04D 25/0673; F04D 17/16; F04D 25/06; F04D 29/083; F04D 29/403; F04D 29/522; F04D 17/165; F04D 25/0613; F04D 25/08; F04D 27/00; F04D 27/002; F04D 29/005; F04D 29/28; F04D 29/325; F04D 29/4213; F04D 29/4226; F04D 29/4253; F04D 29/464; F04D 29/582; F04D 29/602; F04D 29/603; F04D 29/624
USPC ..... 417/360, 423.15, 411, 423.1, 357, 410.1, 417/423.14, 423.3, 510, 313
See application file for complete search history.

(56) References Cited

U.S. PATENT DOCUMENTS 5,584,084 A * 12/1996 Klearman .......... A61G 7/05769 403/349
6,237,653 B1 * 5/2001 Chaffee ............... F04D 25/0673 141/114
6,733,254 B1 * 5/2004 Yen ......................... F04D 17/16 415/206
6,836,914 B1 * 1/2005 Tsai ...................... F04D 25/084 5/713
7,284,291 B2 * 10/2007 Wang ................... A47C 27/081 5/713
7,679,908 B2 * 3/2010 Yeh ......................... G06F 1/181 165/104.34

(Continued)

FOREIGN PATENT DOCUMENTS

CN 116480551 A * 7/2023 .............. F04B 35/04

*Primary Examiner* — Devon C Kramer
*Assistant Examiner* — Benjamin Doyle
(74) *Attorney, Agent, or Firm* — Cooper Legal Group, LLC

(57) ABSTRACT

The present application discloses a dual-purpose inflator pump, including a pump body and a casing, a locking mechanism is provided at the top of the pump body, and the sidewall of the pump body is provided with a trigger configured for controlling the pump body to operate by pressing. The casing is defined with an accommodation chamber for accommodating the pump body, and the accommodation chamber has a top opening; a clamping groove for clamping the locking mechanism is defined on the inner side of the top of the casing; and when the pump body is accommodated in the accommodation chamber, the pump body is rotatably connected to the casing, and the inner side of the casing is fixedly provided with a pressing block for pressing the trigger.

16 Claims, 9 Drawing Sheets

(56) References Cited

U.S. PATENT DOCUMENTS

| | | | | |
|---|---|---|---|---|
| 7,959,419 | B2 * | 6/2011 | Borowski | H05K 7/20172 417/423.15 |
| 8,024,870 | B1 * | 9/2011 | Ballentine | A45F 3/20 34/104 |
| 8,405,989 | B2 * | 3/2013 | Wang | H05K 7/20172 361/688 |
| 10,508,651 | B2 * | 12/2019 | Liu | F04D 25/0673 |
| 2001/0026763 | A1 * | 10/2001 | Chung | F04D 25/0673 417/360 |
| 2004/0241014 | A1 * | 12/2004 | Yen | F04B 35/04 417/360 |
| 2005/0079077 | A1 * | 4/2005 | Tsai | F04D 25/084 417/423.15 |
| 2013/0052050 | A1 * | 2/2013 | Tsai | F04D 29/403 417/360 |
| 2018/0252232 | A1 * | 9/2018 | Shi | F04D 29/503 |
| 2019/0075930 | A1 * | 3/2019 | Zhang | F04D 29/603 |
| 2020/0400149 | A1 * | 12/2020 | Huang | F04D 29/601 |
| 2022/0136524 | A1 * | 5/2022 | Qin | F04D 29/601 415/182.1 |
| 2022/0282734 | A1 * | 9/2022 | Huang | F04B 39/14 |
| 2023/0258199 | A1 * | 8/2023 | Huang | F04D 29/4206 417/423.14 |
| 2023/0349391 | A1 * | 11/2023 | Rao | F04D 25/08 |

* cited by examiner

DUAL-PURPOSE INFLATOR PUMP

CROSS-REFERENCE TO RELATED APPLICATION

This application claims the priority and benefit of Chinese patent application No. 202323360180.8, filed on Dec. 9, 2023. The entirety of Chinese patent application No. 202323360180.8 is hereby incorporated by reference herein and made a part of this specification.

TECHNICAL FIELD

The present application relates to the technical field of inflator pump, and in particular, relates to a dual-purpose inflator pump.

BACKGROUND ART

Due to the advantages of lightweight, small size, and convenient carrying, the inflator products (such as inflator bed, inflator boat and inflator toy) have an increasingly wide application and are increasingly favored by people.

In order to quickly inflate to the inflator products, the inflator pump is used. Currently, some dual-purpose inflator pumps are appeared on the market. The dual-purpose means that, the pump body can be used alone, or the pump body is put into the hosing first, and the casing including the pump body is embedded into the inflator products to be used in combination. However, when the pump body is put into the hosing to be used in combination, the sidewall and bottom of the pump body are wrapped by the casing, so that the switch of the power supply is only provided at the top of the pump body. However, when the pump body is used alone, the users generally hold the peripheral wall of the pump body, so that the switch of the power supply provided at the top end of the pump body is not conducive to users operating the pump body with one hand, so as to operate the inflator pump inconveniently.

SUMMARY

In order to improve the using convenience of the inflator pump, the present application provides a dual-purpose inflator pump.

The dual-purpose inflator pump providing in the present application adopts the following technical solution:

the dual-purpose inflator pump includes:

- a pump body, wherein a locking mechanism is provided at the top of the pump body, and the sidewall of the pump body is provided with a trigger configured for controlling the pump body to operate by pressing; and
- a casing, wherein the casing is defined with an accommodation chamber for accommodating the pump body, and the accommodation chamber has a top opening; a clamping groove for clamping the locking mechanism is defined on the inner side of the top of the casing; and when the pump body is accommodated in the accommodation chamber, the pump body is rotatably connected to the casing, and the inner side of the casing is fixedly provided with a pressing block for pressing the trigger.

In an embodiment, the locking mechanism includes a locking cover plate, a driving component, a resetting component and two locking heads, in which the locking cover plate is fixedly connected in the pump body, the two locking heads are movably connected at the top of the pump body, the resetting component is configured for clamping the locking head and the clamping groove, and the driving component is connected to the locking cover plate for driving the two locking heads to move towards each other, so the two locking heads are unclamped from the clamping groove to drive the two locking heads to move away from each other.

In an embodiment, the driving component includes a button, a pushing block and a first spring, in which the button movably penetrates from the top of the pump body, and the pushing block is fixedly connected to an end of the button penetrating into the pump body; a first end of the first spring is fixedly connected to the pushing block, a second end of the first spring is fixedly connected to the locking cover plate, and the pushing block movably penetrates through the two locking heads; and when the pushing block penetrates through the two locking heads, the pushing block pushes the two locking heads to move towards each other.

In an embodiment, a first end of each of the two locking heads is provided with an overlapping portion, a second end of each of the two locking heads is provided with a clamping component configured for clamping with the clamping groove; the two locking heads comprises a first locking head and a second locking head, a first overlapping portion of the first locking head is overlapped on a second overlapping portion of the second locking head; the pushing block movably passes through the first overlapping portion of the first locking head and the second overlapping portion of the second locking head; when the pushing block passes through the first overlapping portion of the first locking head and the second overlapping portion of the second locking head, the pushing block pushes the first overlapping portion of the first locking head and the second overlapping portion of the second locking head to push the clamping components of the two locking heads to move towards each other.

In an embodiment, a through-hole for inserting the pushing block is defined on the overlapping portion, the sidewall of the through-hole is provided with a first inclined plane located at an end of the through-hole departing from the clamping component; and the pushing block is provided with a second inclined plane, and each of the locking heads is driven by the pushing block with the second inclined plane abutting against the first inclined plane.

In an embodiment, the resetting component includes two second springs, two accommodation grooves for accommodating the two second spring are provided on the locking head; the pump body is provided with two limiting columns for extending into the accommodation grooves; and a first end of each of the two second springs is connected to one of the limiting columns, and a second end of each of the two second springs is connected to the locking head In an embodiment, a side of the trigger is slidably provided with a stand-alone slide switch moving to approach or depart from the trigger; the trigger includes a switch bracket, a third spring, a movable block and a trigger switch, the switch bracket is fixedly connected to the pump body, the movable block movably passes through the pump body, and the trigger switch is located in the pump body; a first end of the third spring is fixedly connected to the movable block, and a second end of the third spring is fixedly connected to the switch bracket; when the third spring is in a natural state, an end of the movable block departing from the third spring penetrates from the pump body, and when the third spring is in a pressed state, the movable block presses a switch end of the trigger switch.

In the above technical solution, the switch bracket is fixedly connected to the pump body for supporting the third spring, the movable block and the trigger switch. When the pump body is used alone, the users push the stand-alone slide switch to move towards the movable block, and the movable block is pressed by the stand-alone slide switch to enter the pump body to press the switch end of the trigger switch, so as to open the pump body to operate. The users push the stand-alone slide switch to move away from the movable block, an end of the movable block departing from the third spring extends out of the pump body due to the rebound force of the third spring, the switch end of the trigger switch is not pressed, so the pump body stops operating. When the pump body and the casing are used in combination, the users rotate the pump body to the position where the pump body presses the movable block, the movable block is pressed to enter into the pump body to press the switch end of the trigger switch, so as to open the pump body to operate. The users continue to rotate the pump body, the pressing block does not press the movable block, the end of the movable block departing from the third spring is pushed out of the pump body due to the rebound force of the third spring, the switch end of the trigger switch is not pressed, so the pump body stops operating. The operation of using the pump body alone or combining the pump body and the casing is simple, which is conductive to improve the using convenience of the inflator pump.

In an embodiment, a side of the trigger is slidably provided with a stand-alone slide switch moving to approach or depart from the trigger; the stand-alone slide switch is inclined towards an end of the movable block to define as a first inclined end of the stand-alone slide switch, and an end of the movable block towards the stand-alone slide switch is inclined to define as a second inclined end of the movable block, and the first inclined end of the stand-alone slide switch attaches to the second inclined end of the movable block.

In the above technical solution, the stand-alone slide switch would press the movable block during moving to approach the movable block due to the setting of the above structure, and the movable block is pressed into the pump body to press the switch end of the trigger switch, so the pump body begins to operate when it is used alone.

In an embodiment, the stand-alone slide switch is slidably connected to the switch bracket.

In an embodiment, the two sides of the movable block are inclined.

In the above technical solution, due to the setting of the above structure, during the pressing block aligns with movable block due to the rotation of the pump body, the movable block is pressed into the pump body by the pressing block to further press the switch end of the trigger switch, so the pump body begins to operate when it used with the casing in combination.

In an embodiment, a valve train is provided at the bottom of the outer cylinder body; and when the pump body operates to generate the airflow, the bottom of the casing is opened by the valve train, and when the pump body does not operate, the bottom of the casing is closed by the valve train.

In the above technical solution, when the pump body and the casing are used in combination, the pump body operates to generate airflow, meanwhile the bottom of the casing is opened by the valve train, the airflow enters into the inflator products from the bottom of the casing, which is conductive to inflate the inflator products. When the pump body does not operate, the bottom of the casing is closed by the valve train, which is conductive to prevent air leakage from the inflator products.

In an embodiment, the valve train includes a valve body support, a protective casing and a fourth spring, the protective casing is connected to the bottom of the pump body; the protective casing is provided with an air inlet for the accommodation chamber being in communication with the exterior of the casing, and the valve body is located between the protective casing and the bottom of the casing. A first end of the fourth spring is fixedly connected to the valve body support, and a second end thereof is fixedly connected to the protective casing. When the valve body support moves to approach the protective casing, the air inlet is opened by the valve body support, and when the valve body support moves to approach the casing, the air inlet is closed by the valve body support.

In the above technical solution, when the pump body and the casing are used in combination, the pump body operates to generate airflow, the valve body is pushed by the airflow to move towards the protective casing, and the air inlet is opened by the valve body support, so the inflator products can be inflated by the airflow through the air inlet. When pump body stops operating and does not generate the airflow, the valve body support is pushed to move towards the casing due to the rebound force of the fourth spring, and the air inlet is closed by the valve body support, which is conductive to prevent air leakage from the inflator products.

In an embodiment, a side of the valve body support is provided with a sealing ring towards the casing.

In the above technical solution, when the bottom of the casing is closed by the valve body support, the sealing ring facilitates improving the sealing ability of the inflator pump, and further improving the sealing ability of the inflator products.

In an embodiment, the valve train further includes a positioning steel ball and a locking spring, and a blind groove for accommodating the positioning steel ball and the locking spring is provided on the valve body support; a first end of the locking spring is connected to the bottom wall of the blind groove, and the second end of the locking spring is connected to the positioning steel ball; an end of the positioning steel ball departing from the locking spring protrudes from the blind groove; and a first positioning groove for clamping with the positioning steel ball is provided at the bottom of the pump body.

In an embodiment, the valve body support is provided with a guiding column, and a guiding groove for extending the guiding column is defined at the bottom of the pump body.

In an embodiment, the guiding groove is of an arc shape.

In an embodiment, the valve train further includes a positioning steel ball and a locking spring, and a blind groove for accommodating the positioning steel ball and the locking spring is provided on the guiding column; a first end of the locking spring is connected to the bottom wall of the blind groove, and the second end of the locking spring is connected to the positioning steel ball; an end of the positioning steel ball departing from the locking spring protrudes from the blind groove; and a second positioning groove for clamping with the positioning steel ball is provided at a groove wall of the guiding groove.

In summary, the present application includes at least one of the following beneficial technical effects:

1. the pump body is provided with a locking mechanism, trigger component and a stand-alone slide switch, and the casing is provided with a clamping groove and pressing block. When the pump body is used alone, the users can easily push the stand-alone slide switch to move towards the movable block when the pump body is held, the stand-alone slide switch presses the trigger button to control the pump body to operate. The users push the stand-alone slide switch to move away from the trigger, and the stand-alone slide switch does not press the trigger to stop the pump body from operating; when the pump body and casing are used in combination, the pump body is placed in the accommodation chamber of the casing, and the pump body is connected to the casing through clamping the locking mechanism in the clamping groove. The users rotate the pump body, so the pump body moves to the position where the pressing block presses the trigger, and the pressing block presses the trigger to control the pump body to operate. The users continue to rotate the pump body, the pressing block does not press the trigger to stop the pump body from operating. Therefore, the operation of using the pump body alone or combining the pump body and the casing is simple, which is conductive to improve the using convenience of the inflator pump.

2. By setting the locking head, the driving component, and the resetting component, when the pump body needs to be connected in the casing, the users drive the two locking heads to move towards each other through the driving component to avoid a position for the pump body entering the accommodation chamber. When the pump body enters the accommodation chamber of the casing, the two locking heads align with the clamping groove, and the users stop driving the driving component, the two locking heads move away from each other due to the effect of the resetting component, so the two locking heads can be directly clamped into the clamping groove, and the pump body and the casing are assembled together. Therefore, the assembly operation between the pump body and the casing is simple and convenient.
3. By setting the button, the pushing block, and the first spring, when the pump body is need to be assembled with the casing, the users press the button, and the pushing block is pushed by the button to extend into the two locking heads. During the pushing block extends into the two locking heads, the first spring is compressed, and the two locking heads are pushed to approach each other by the two sides of the pushing block. The two locking heads move towards each other to avoid a position for the pump body entering the accommodation chamber of the casing. When the users release the button, the pushing block is pushed out of the two locking heads due to the rebound force of the first spring, meanwhile the button is pushed out of the pump body, thereby resetting the button.

DETAILED DESCRIPTION

The present application will be further described in detail below with reference to FIGS. 1-8.

Figure 1:
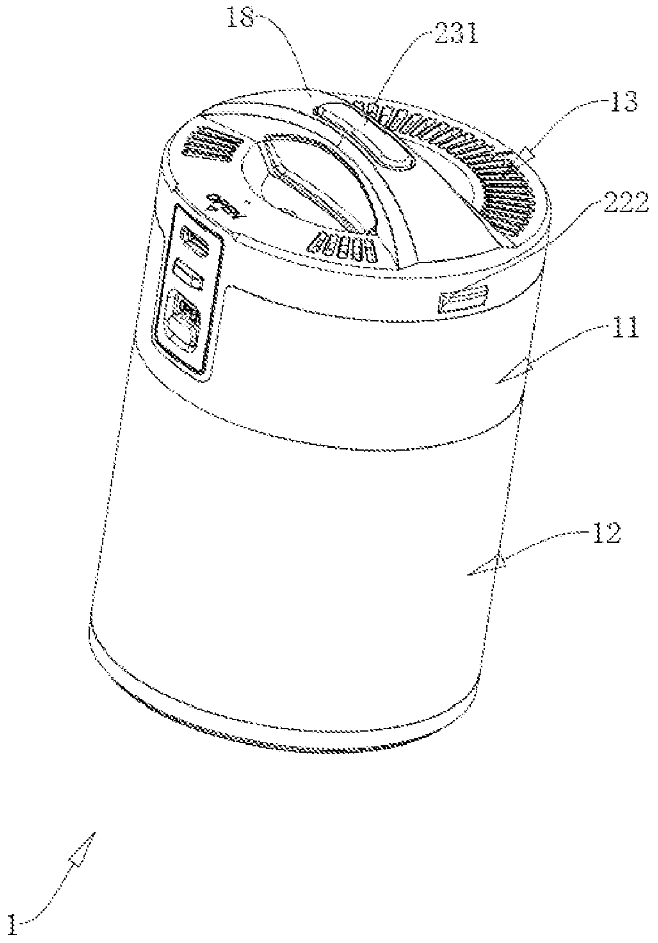
FIG. 1 is a schematic structural view of a pump body according to embodiment of the present application.
Figure 2:
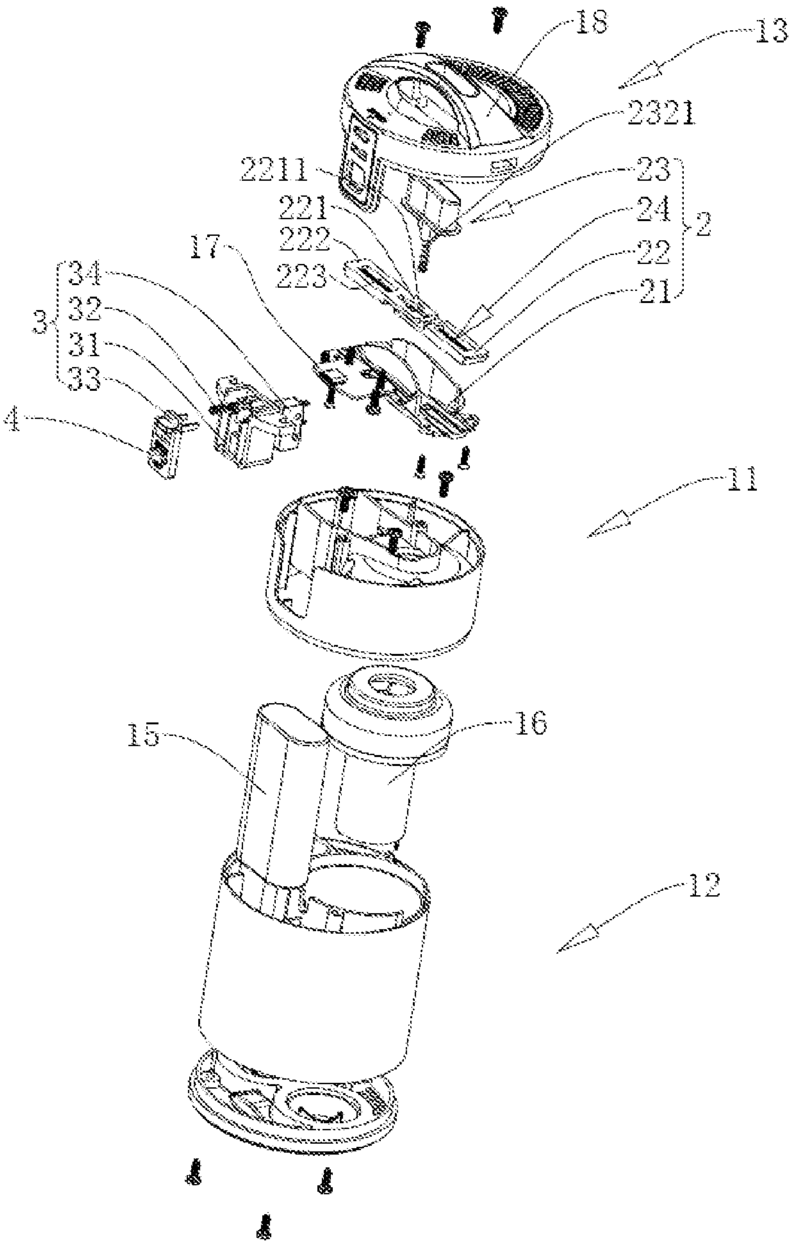
FIG. 2 is an exploded view of the pump body according to embodiment of the present application.

The embodiment discloses a dual-purpose inflator pump, referring to FIGS. 1-2, including a pump body 1 which is a cylindrical. The pump body 1 includes an upper cylinder body 11 and a lower cylinder body 12 which are fixedly connected with each other via a bolt, and a panel 13 fixedly connected to an end of the upper cylinder body 11. A battery 15 for power supply, a fan module 16 for generating airflow 94 and a PCB board 17 for controlling on-off of the fan module 16 through touching are fixedly mounted in the pump body 1, and a sidewall of the pump body 1 is provided with a trigger 3 for controlling the pump body 1 to operate by pressing. In addition, a side of the trigger 3 is provided with a stand-alone slide switch 4 moving to approach or depart from the trigger 3.

When the inflator product is inflated by the pump body 1, the stand-alone slide switch 4 moves to approach the trigger 3, the trigger 3 is pressed by the stand-alone slide switch 4 to send signals to the PCB board 17 for opening the fan module 16, and the fan module 16 operates to generate airflow 94, so that the inflator products are inflated. When stand-alone slide switch 4 moves to depart away the trigger 3, the trigger 3 is not pressed by the stand-alone slide switch 4 and sends signals to the PCB board 17 for closing the fan module 16 not to generate airflow 94, so that the inflator products are stopped to be inflated.

Figure 3:
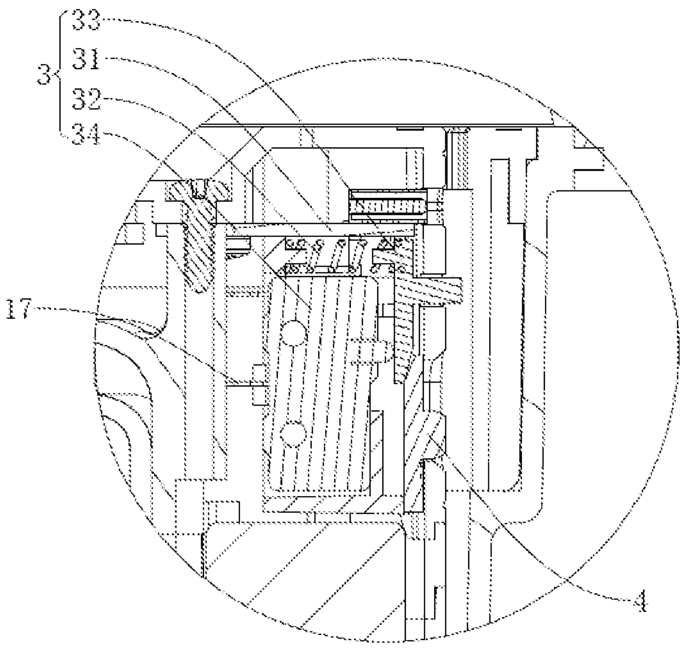
FIG. 3 is a schematic sectional view illustrating the pump body being located at a position of a trigger according to embodiment of the present application.

Referring to FIGS. 2-3, the trigger 3 includes a switch bracket 31, a third spring 32, a movable block 33 and a trigger switch 34. Specifically, the switch bracket 31 is fixedly connected on the sidewall of the upper cylinder body 11 for supporting the third spring 32, the movable block 33 and the trigger switch 34. The movable block 33 movably passes through the sidewall of the upper cylinder body 11, the trigger switch 34 is located in the pump body 1, and a switch end of the trigger switch 34 is pressed by the movable block 33. A first end of the third spring 32 is fixedly connected to the movable block 33, and a second end thereof is fixedly connected to the switch bracket 31. When the stand-alone slide switch 4 moves to depart from the movable block 33, the third spring 32 is in a natural state, an end of the movable block 33 departing from the third spring 32 passes through the sidewall of the upper cylinder body 11, and the switch end of the trigger switch 34 is not pressed by the movable block 33, so the fan module 16 does not operate. When the stand-alone slide switch 4 moves to approach the movable block 33, the third spring 32 is in a pressed state, the movable block 33 penetrates into the upper cylinder body 11 and presses the switch end of the trigger switch 34 to open the fan module 16, so as to inflate the pump body 1.

Referring to FIGS. 2-3, the stand-alone slide switch 4 is slidably connected to the switch bracket 31, and inclined towards the end of the movable block 33. In addition, an end of the movable block 33 towards the stand-alone slide switch 4 is inclined, so that the inclined end of the stand-alone slide switch 4 attaches to the inclined end of the movable block 33. When the stand-alone slide switch 4 moves to approach the movable block 33, the end of the stand-alone slide switch 4 attaching the movable block 33 presses the movable block 33 during movement, so the movable block 33 enters into the pump body 1 and presses the switch end of the trigger switch 34, so as to open the fan module 16.

Figure 4:
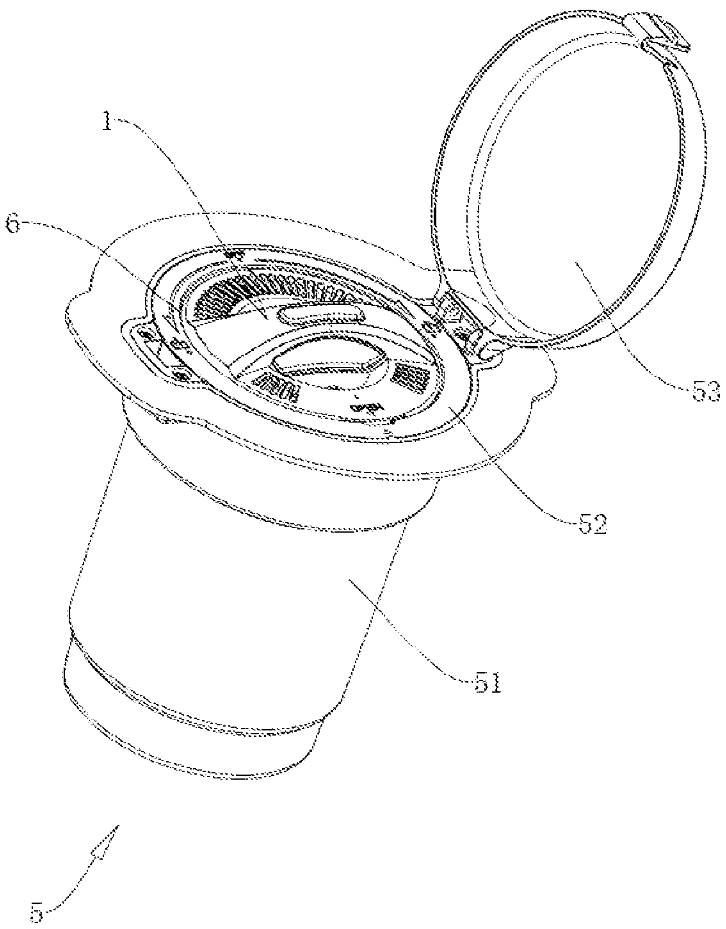
FIG. 4 is a schematic structural view illustrating the pump body being installed in a casing according to embodiment of the present application.
Figure 5:
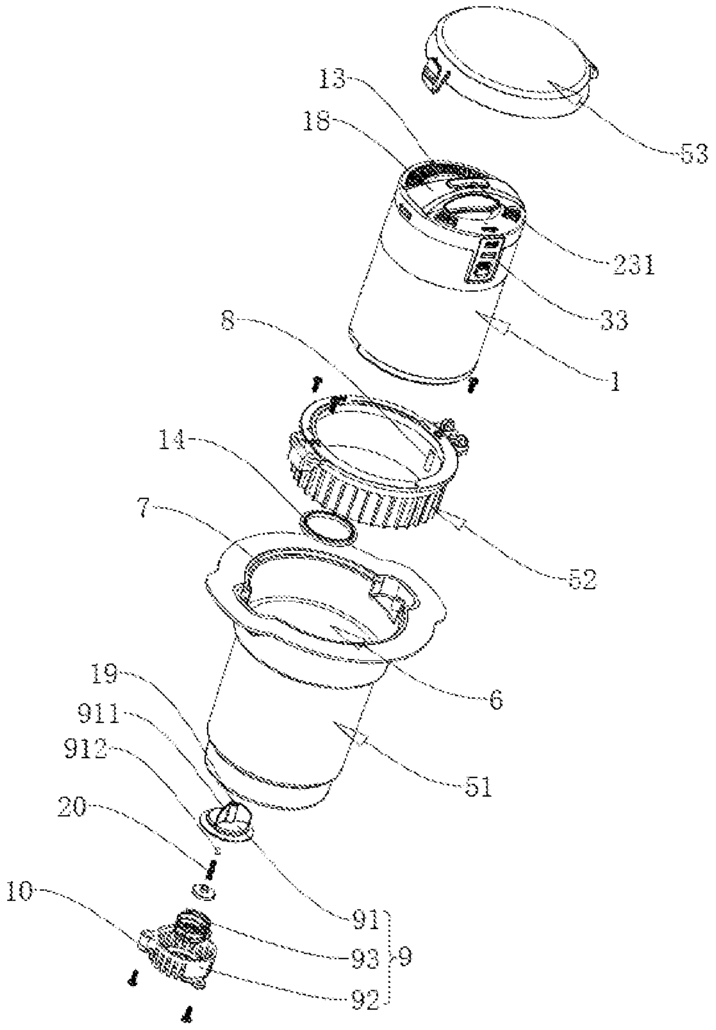
FIG. 5 is an exploded view of the pump body and the casing according to embodiment of the present application.

Referring FIGS. 4-5, the dual-purpose inflator pump further includes a casing 5, and the casing 5 is defined with an accommodation chamber 6 for accommodating the pump body 1, and the accommodation chamber 6 has a top opening. A clamping groove 7 is defined on the inner side of the top of the casing 5. Referring to FIG. 2, the top of the pump body 1 is correspondingly provided with a locking mechanism 2 for clamping the clamping groove 7. When the pump body 1 is accommodated in the accommodation chamber 6, and the pump body 1 is rotatably connected to the casing 5.

Referring FIGS. 4-5, the casing 5 includes an outer cylinder body 51, a cylinder body support 52 and a protection cover 53, the cylinder body support 52 is fixedly connected to the top of inner side of the outer cylinder body 51 by bolts for supporting the pump body 1 accommodating in the accommodation chamber 6, and the protection cover 53 is hinged on the opening at the top of the outer cylinder body 51 to protect the pump body 1 accommodating in the accommodation chamber 6. It should be noted that, the clamping groove 7 is defined on the inner side of the top of the outer cylinder body 51 for the buckle connection of the locking mechanism 2, so the pump body 1 is rotatably connected to the casing 5.

Referring to FIG. 2, the locking mechanism 2 includes a locking cover plate 21, a driving component 23, a resetting component 24 and two overlapped locking heads 22 provided relative to each other, in which the locking cover plate 21 is fixedly connected in the pump body 1 and supports the two locking heads 22, the driving component 23 and the resetting component 24, the two locking heads 22 movably passes through the two sidewalls of the panel 13, respectively, and the driving component 23 is connected to the locking cover plate 21 for driving the two locking heads 22 to move towards each other. After the driving component 23 drives the two locking heads 22 to move towards each other, the two locking heads 22 extends into the panel 13, the two locking heads 22 are unclamped from the clamping groove 7 for facilitating removing and placing of the pump body 1 in the casing 5. The resetting component 24 is configured for driving the two locking heads 22 to move away from each other, so the two locking heads 22 are clamped into the clamping groove 7. Referring to FIG. 5, after the pump body 1 is placed in the accommodation chamber 6, the resetting component 24 drives the two locking heads 22 to move away from each other, so the two locking heads 22 extends from the relative sides of the panel 13 and are clamped in the clamping groove 7, and the two locking heads 22 can slide along the length direction of the clamping groove 7, so the pump body 1 is rotatably connected to the casing 5.

Figure 6:
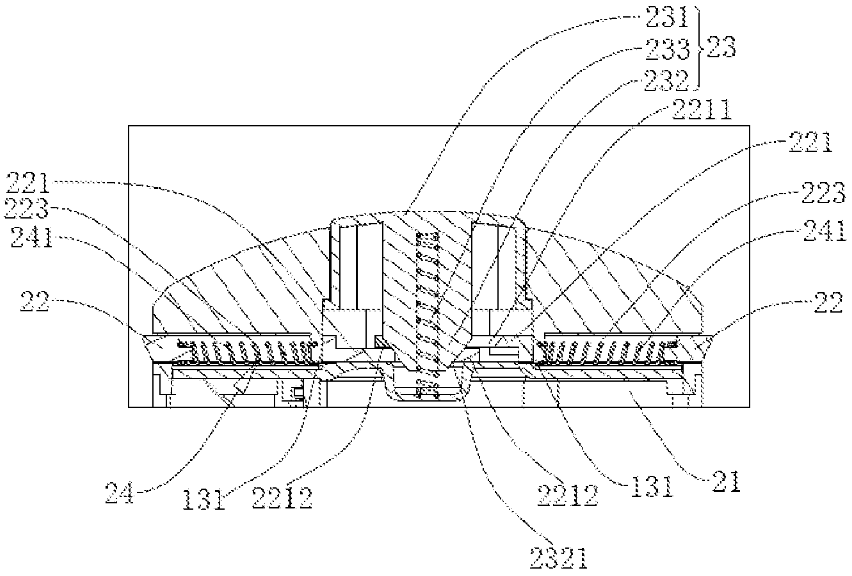
FIG. 6 is a schematic sectional view illustrating the pump body being located at a position of a driving component according to embodiment of the present application.

Referring to FIGS. 5-6, the driving component 23 includes a button 231, a pushing block 232 and a first spring 233, in which the button 231 passes through the panel 13 along the central axis of the pump body 1. In this embodiment, a handle 18 is fixedly connected at the top of the panel 13, the button 231 movably passes through the handle 18 and the top of the panel 13, and the pushing block 232 is fixedly connected to an end of the button 231 passing through the panel 13. A first end of the first spring 233 is fixedly connected to the pushing block 232, a second end of the first spring 233 is fixedly connected to the locking cover plate 21, and the pushing block 232 movably passes through the two locking heads 22. When the first spring 233 is in a natural state, the top end of the button 231 extends out of the handle 18. When the button 231 is pressed into the handle 18 to push the pushing block 232 to extend in the two locking heads 22, the two locking heads 22 are pushed by the two sides of the pushing block 232 to move towards each other, so as to avoid a position for putting the pump body 1 into the casing 5.

In an embodiment, a first end of the locking head 22 is provided with an overlapping portion 221, a second end of the locking head 22 is provided with a clamping component 222 configured for clamping with the clamping groove 7. In the two locking heads 22, the overlapping portion 221 of one locking head 22 is overlapped on the overlapping portion 221 of the other locking head 22, and the pushing block 232 movably passes through the above two overlapping portions 221 of the two locking heads 22. When the pushing block 232 passes through the above two overlapping portions 221 of the two locking heads 22, the overlapping portions 221 of the two locking heads 22 are pushed by the pushing block 232 to push the clamping components 222 of the two locking heads 22 to move towards each other. The pushing block 232 is of an inverted triangular shape, that is, the two sides of the pushing block 232 are provided with a second inclined plane 2321, respectively. A through-hole 2211 for inserting the pushing block 232 is defined on the overlapping portion 221, the sidewall of the through-hole 2211 is provided with a first inclined plane 2212 located at an end of the through-hole 2211 departing from the clamping component 222. During the pushing block 232 passes through the two locking heads 22, that is, the pushing block 232 is inserted into the through-hole 2211, the second inclined plane 2321 abuts against the first inclined plane 2212, so the two locking heads 22 moves to approach each other.

Referring to FIGS. 5-6, the resetting component 24 includes two second springs 241, two accommodation grooves 223 for accommodating the second springs 241 are provides on the locking head 22. The panel 13 of the pump body 1 is provided with two limiting columns 131, each of which extends into one of the accommodation grooves 223, a first end of the second spring 241 is connected to one of the limiting columns 131, and a second end of each of the second springs 241 is connected to the locking head 22. When the pump body 1 is put into the accommodation chamber 6 of the casing 5, the users release the button 231, the top end of the button 231 is pushed out of the handle 18 by the first spring 233, the pushing block 232 leaves the overlapping area of the two locking heads 22, the two locking heads 22 are pushed to move away from each other by the rebound force of the second spring 241, and the two locking heads 22 are inserted into the clamping groove 7, so the pump body 1 can be rotatably connected to the casing 5.

Referring to FIG. 5, the inner side of the casing 5 is fixedly provided with a pressing block 8 for pressing the movable block 33. In this embodiment, the pressing block 8 is fixedly provided on the inner side of the cylinder body support 52. When the pump body 1 is connected to the casing 5, the pressing block 8 and the movable block 33 are located at a same cross section. When the pump body 1 rotates the position where the pressing block 8 aligns with the movable block 33, the pressing block 8 presses the movable block 33 to push the movable block 33 to extend into the pump body 1, so as to open the fan module 16 in the pump body 1. The pump body 1 continues to rotate, the pressing block 8 does not align with the movable block 33, and the movable block 33 is not pressed by the pressing block 8, so the fan module 16 stops operating. The process of the movable block 33 extending into the pump body 1 to open the fan module 16 is same as the process after the above stand-alone slide switch 4 pressing the movable block 33, and it is not mentioned again here.

It is worth mentioning that the two sides of the movable block 33 are inclined, and the movable block 33 is easy to be pressed into the pump body 1 by the pressing block 8 during the rotation of the pump body 1.

Referring to FIGS. 4-5, a valve train 9 for opening and closing the bottom of the casing 5 is provided at the bottom of the outer cylinder body 51. When the pump body 1 operates to generate the airflow 94, the bottom of the casing 5 is opened by the valve train 9, so the airflow 94 of the pump body 1 in the accommodation chamber 6 can flow out of the casing 5 from its bottom to inflate the inflator products. When the pump body 1 does not operate, the bottom of the casing 5 is covered by the valve train 9 to prevent air leakage from the inflator products.

Figure 7:
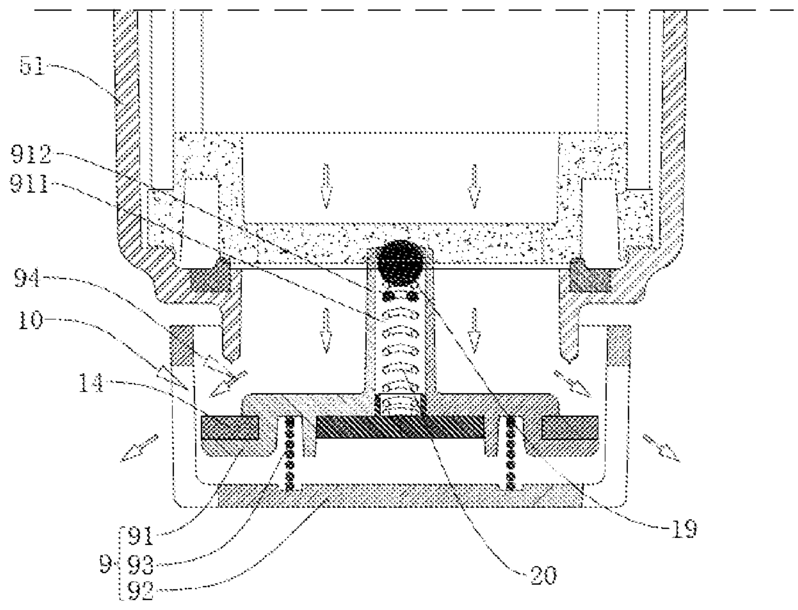
FIG. 7 is a schematic sectional view illustrating the casing being located at a position of a valve train with generating airflow according to embodiment of the present application
Figure 8:
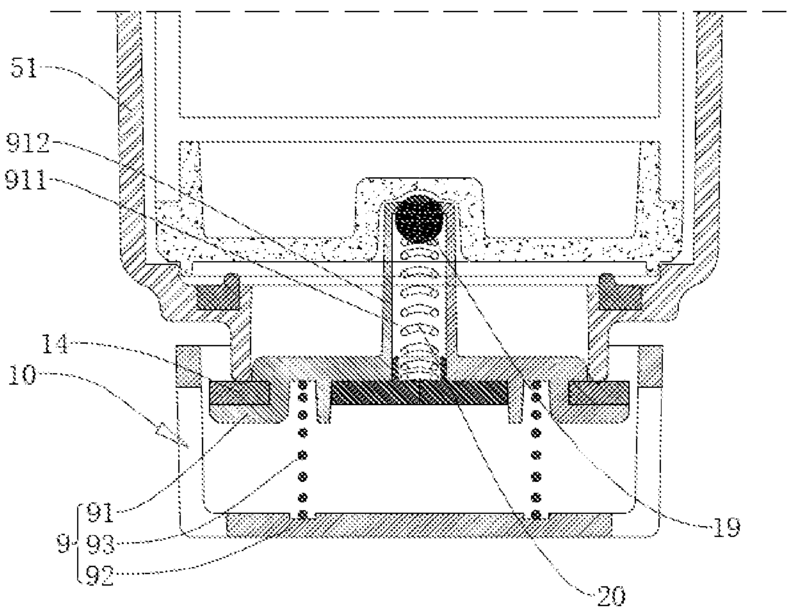
FIG. 8 is a schematic sectional view illustrating the casing being located at the position of the valve train without generating airflow according to embodiment of the present application
Figure 9:
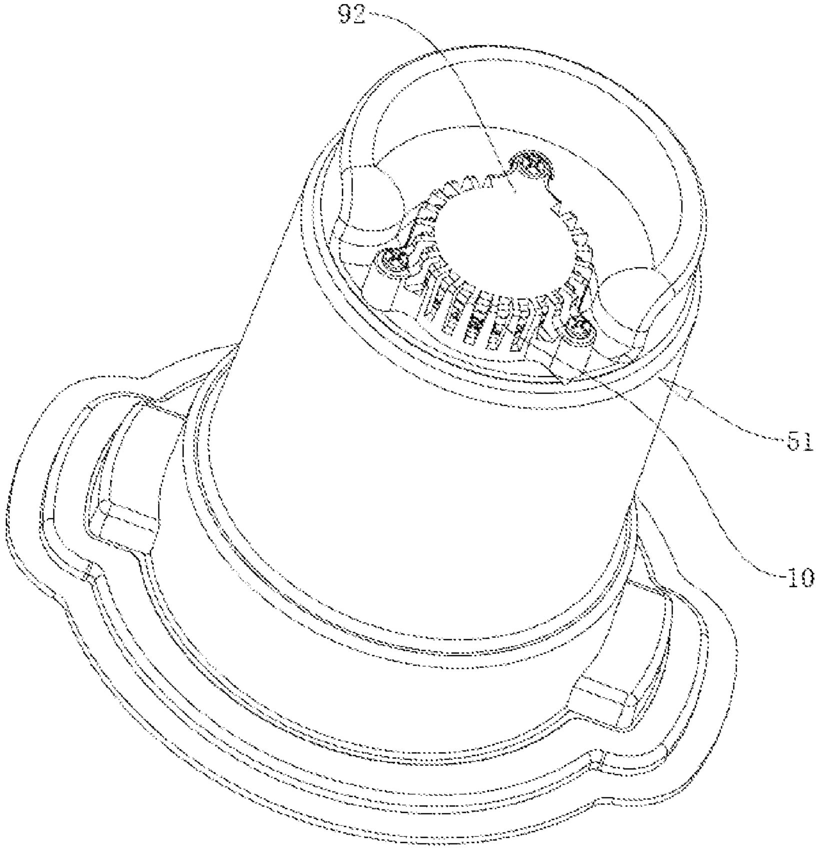
FIG. 9 is a schematic structural view of engagement of the casing and the valve train according to embodiment of the present application.

Referring to FIGS. 5, 7 and 9, the valve train 9 includes a valve body support 91, a protective casing 92 and a fourth spring 93, in which the protective casing 92 is fixedly connected to the bottom of the outer cylinder body 51, and the interior of the protective casing 92 is in communication with the interior of the accommodation chamber 6. The protective casing 92 is provided with an air inlet 10 for the accommodation chamber 6 being in communication with the exterior of the casing 5. The valve body support 91 is located between the protective casing 92 and the bottom of the casing 5. A first end of the fourth spring 93 is fixedly connected to the valve body support 91, and a second end thereof is fixedly connected to the protective casing 92. When the fan module 16 operates to generate airflow 94, the valve body support 91 is pushed by the airflow 94 to move approach the protective casing 92, the air inlet 10 is opened by the valve body support 91 to inflate the inflator products. Referring to FIG. 8, when the fan module 16 stops operating and does not generate the airflow 94, the valve body support 91 is pushed to move towards the casing 5 due to the rebound force of the fourth spring 93, so as to close the air inlet 10 to prevent air leakage from the inflator products. Specifically, an entrance for the accommodation chamber 6 being in communication with the air inlet 10 is provided at the bottom of the casing 5. The air inlet 10 is closed by the valve body support 91, that is, the valve body support 91 blocks between the entrance and the air inlet 10, so that the entrance is not in communication with the air inlet 10, so the accommodation chamber 6 is not in communication with the casing 5.

Figure 10:
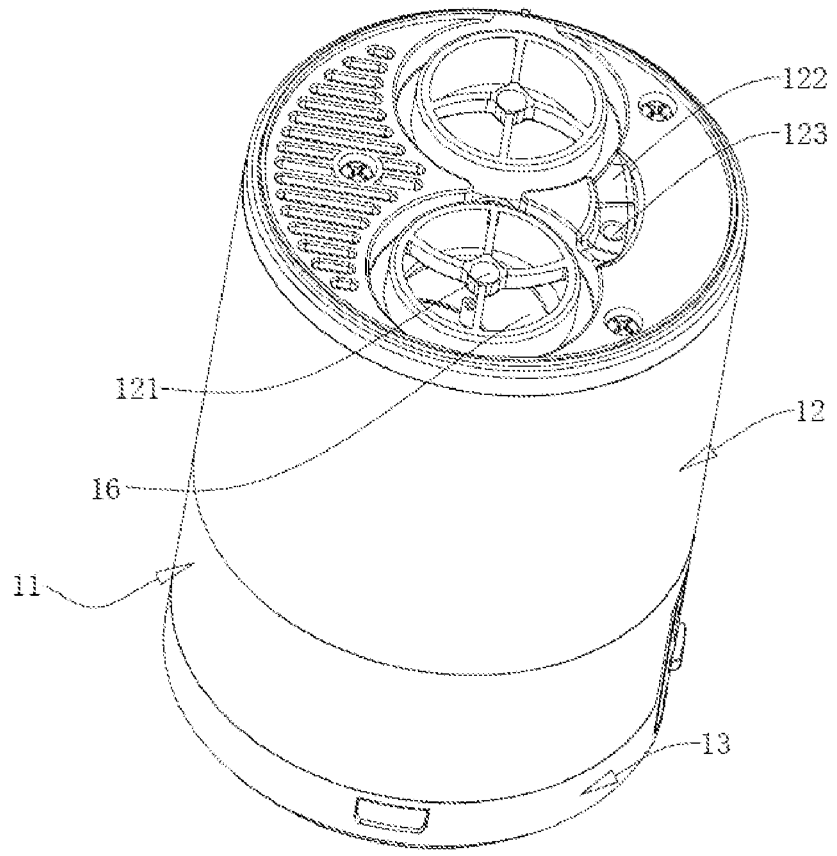
FIG. 10 is a schematic structural view of the pump body from another perspective according to embodiment of the present application.

In order to improve the sealing ability, the side of the valve body support 91 is provided with a sealing ring 14 towards the casing 5. When the air inlet 10 is sealed by the valve body support 91, and the connection part of the valve body support 91 and the bottom of the outer cylinder body 51 is sealed by the sealing ring 14. In this embodiment, the sealing ring 14 is soft silicone gasket which can further improve the sealing ability. Besides, referring to FIG. 10, the valve train 9 further includes a positioning steel ball 19 and a locking spring 20, the valve body support 91 is provided with a guiding column 912, and a blind groove 911 for accommodating the positioning steel ball 19 and the locking spring 20 is defined in the guiding column 912. An arc-shaped guiding groove 122 for extending the guiding column 912 is defined at the bottom of the pump body 1. A first end of the locking spring 20 is connected to the bottom wall of the blind groove 911, and the second end of the locking spring 20 is connected to the positioning steel ball 19. An end of the positioning steel ball 19 departing from the locking spring 20 protrudes from the blind groove 911. A first positioning groove 121 for clamping with the positioning steel ball 19 is provided at the bottom of the pump body 1. A second positioning groove 123 for clamping with the positioning steel ball 19 is defined on the groove wall of guiding groove 122. The positioning steel ball 19 and the locking spring 20 have a positioning function to improve the stability of the pump body 1 and casing 5 when they are used in combination.

An implementation principle of the dual-purpose inflator pump of this embodiment of the present application is as follows.

When the pump body 1 is used alone, the users can easily push the stand-alone slide switch 4 to move towards the movable block 33 when the pump body 1 is held, the stand-alone slide switch 4 presses the movable block 33 to further press the switch end of the trigger switch 34, so as to control the fan module 16 to operate. The fan module 16 operates to generate airflow 94, so as to inflate the inflator products. The stand-alone slide switch 4 moves to depart from the movable block 33, and does not press the movable block 33, so that the fan module 16 stops operating.

When the pump body 1 and the casing 5 are used in combination, the user presses the button 231 to drive the pushing block 232 to penetrate into the position where the two locking heads 22 are overlapped. The two second inclined planes 2321 of the pushing block 232 push the two locking heads 22 to move towards each other, so that the pump body 1 can be placed in the accommodation chamber 6 of the casing 5. After the pump body 1 is placed in the accommodation chamber 6 of the casing 5, the users release the button 231, the first spring 233 pushes the upper end of the button 231 out of the handle 18 to reset the button 231. At the same time, the pushing block 232 leaves the position where the two locking heads 22 are overlapped. The two locking heads 22 moves to depart from each other by the rebound force of the second spring 241, and the two locking heads 22 are inserted into the clamping groove 7, so the pump body 1 is rotatably connected to the casing 5. When the pump body 1 rotates the position where the pressing block 8 aligns with the movable block 33, the pressing block 8 presses the movable block 33 to push the movable block 33 to extend into the pump body 1, so as to open the fan module 16 in the pump body 1. The pump body 1 continues to rotate, and the pressing block 8 does not align with the movable block 33, so that the fan module 16 stops operating.

The operation of using the pump body 1 alone or combining the pump body 1 and the casing 5 is simple, which is conductive to improve the using convenience of the inflator pump.

LIST OF REFERENCE SIGNS

1. pump body; 11. upper cylinder body; 12. lower cylinder body; 121. first positioning groove; 122. guiding groove; 123. second positioning groove; 13. panel; 131. limiting column; 2. locking mechanism; 21. locking cover plate; 22. locking head; 221. overlapping portion; 2212. first inclined plane; 2211. through-hole; 2212. first inclined plane; 222. clamping component; 223. accommodation groove; 23. driving component; 231. button; 232. pushing block; 2321. second inclined plane; 233. first spring; 24. resetting component; 241. second spring; 3. trigger; 31. switch bracket; 32. third spring; 33. movable block; 34. trigger switch; 4. stand-alone slide switch; 5. casing; 51. outer cylinder body; 52. cylinder body support; 53. protection cover; 6. accommodation chamber; 7. clamping groove; 8. pressing block; 9. valve train; 91. valve body support; 911. blind groove; 912. guiding column; 92. protective casing; 93. fourth spring; 94. airflow; 10. air inlet; 14. sealing ring; 15. battery; 16. fan module; 17. PCB board; 18. handle; 19. positioning steel ball; 20. locking spring.

What is claimed is:

1. A dual-purpose inflator pump, comprising:

a pump body, wherein a locking mechanism is provided at a top of the pump body, and a trigger configured to be pressed to control the pump body to operate is provided on a sidewall of the pump body; and a casing, wherein the casing is provided with an accommodation chamber for accommodating the pump body, the accommodation chamber has a top opening, a clamping groove for clamping the locking mechanism is provided on an inner side of the casing at a top of the casing, when the pump body is accommodated in the accommodation chamber, the pump body is rotatably connected to the casing, and a pressing block for pressing the trigger is fixedly provided on the inner side of the casing, wherein the locking mechanism comprises a locking cover plate, a driving component, a resetting component and two locking heads, the locking cover plate is fixedly connected to the pump body, the two locking heads are movably connected at the top of the pump body, the resetting component is configured for driving the two locking heads to move away from each other such that the two locking heads are clamped into the clamping groove, and the driving component is connected to the locking cover plate for driving the two locking heads to move towards each other such that the two locking heads are unclamped from the clamping groove.

2. The dual-purpose inflator pump according to claim 1, wherein the driving component comprises a button, a pushing block and a first spring, the button movably penetrates through the top of the pump body, the pushing block is fixedly connected to an end of the button penetrating into the pump body, a first end of the first spring is fixedly connected to the pushing block, a second end of the first spring is fixedly connected to the locking cover plate, the pushing block movably penetrates through the two locking heads, and when the pushing block penetrates through the two locking heads, the two locking heads are pushed by the pushing block to move towards each other.

3. The dual-purpose inflator pump according to claim 2, wherein an overlapping portion is provided at a first end of each of the two locking heads, a clamping component for clamping with the clamping groove is provided at a second end of each of the two locking heads, the two locking heads comprises a first locking head and a second locking head, a first overlapping portion of the first locking head is overlapped on a second overlapping portion of the second locking head, the pushing block movably passes between the first overlapping portion of the first locking head and the second overlapping portion of the second locking head, and when the pushing block passes between the first overlapping portion of the first locking head and the second overlapping portion of the second locking head, the pushing block pushes the first overlapping portion of the first locking head and the second overlapping portion of the second locking head such that the clamping components of the two locking heads are pushed to move towards each other.

4. The dual-purpose inflator pump according to claim 3, wherein a through-hole for the pushing block to be inserted into is provided on one of the first overlapping portion or the second overlapping portion, a first inclined plane is provided on a sidewall of the through-hole, the first inclined plane is located at an end of the through-hole departing from a respective one of the clamping components, the pushing block is provided with a second inclined plane, and each of the two locking heads is driven by the pushing block with the second inclined plane abutting against the first inclined plane.

5. The dual-purpose inflator pump according to claim 2, wherein the resetting component comprises two second springs, two accommodation grooves for accommodating the two second springs are provided on the two locking heads, the pump body is provided with two limiting columns for extending into the two accommodation grooves, a first end of each of the two second springs is connected to one of the two limiting columns, and a second end of each of the two second springs is connected to one of the two locking heads.

6. The dual-purpose inflator pump according to claim 5, wherein the trigger comprises a switch bracket, a third spring, a movable block and a trigger switch, the switch bracket is fixedly connected to the pump body, the movable block movably passes through the pump body, the trigger switch is located in the pump body, a first end of the third spring is fixedly connected to the movable block, a second end of the third spring is fixedly connected to the switch bracket, when the third spring is in a natural state, a first end of the movable block departing from the third spring penetrates through the pump body, and when the third spring is in a pressed state, the movable block presses a switch end of the trigger switch.

7. The dual-purpose inflator pump according to claim 6, wherein a stand-alone slide switch is slidably provided on a side of the trigger, the stand-alone slide switch is configured to move to approach or depart from the trigger, the stand-alone slide switch is inclined towards a second end of the movable block to define a first inclined end of the stand-alone slide switch, the second end of the movable block towards the stand-alone slide switch is inclined, and the first inclined end of the stand-alone slide switch attaches to the second end of the movable block.

8. The dual-purpose inflator pump according to claim 7, wherein the stand-alone slide switch is slidably connected to the switch bracket.

9. The dual-purpose inflator pump according to claim 6, wherein two sides of the movable block are inclined.

10. The dual-purpose inflator pump according to claim 6, wherein a valve train is provided at a bottom of an outer cylinder body of the casing for opening or closing the bottom of the outer cylinder body, when the pump body operates to generate airflow, the bottom of the outer cylinder body of the casing is opened by the valve train, and when the pump body does not operate, the bottom of the outer cylinder body of the casing is closed by the valve train.

11. The dual-purpose inflator pump according to claim 10, wherein the valve train comprises a valve body support, a protective casing and a fourth spring, the protective casing is connected to a bottom of the pump body, the protective casing is provided with an air inlet for communication of the accommodation chamber with an exterior of the casing, the valve body support is located between the protective casing and the bottom of the outer cylinder body of the casing, a first end of the fourth spring is fixedly connected to the valve body support, a second end of the fourth spring is fixedly connected to the protective casing, when the valve body support moves towards the protective casing, the air inlet is opened by the valve body support, and when the valve body support moves towards the casing, the air inlet is closed by the valve body support.

12. The dual-purpose inflator pump according to claim 11, wherein a sealing ring is provided on the valve body support at a position of an edge of the valve body support towards the casing.

13. The dual-purpose inflator pump according to claim 11, wherein the valve train further comprises a positioning steel ball and a locking spring, a blind groove for accommodating the positioning steel ball and the locking spring is provided on the valve body support, a first end of the locking spring is connected to a bottom wall of the blind groove, a second end of the locking spring is connected to the positioning steel ball, an end of the positioning steel ball departing from the locking spring protrudes from the blind groove, and a-first positioning groove for clamping with the positioning steel ball is provided at the bottom of the pump body.

14. The dual-purpose inflator pump according to claim 11, wherein the valve body support is provided with a guiding column, and a guiding groove, into which the guiding column extends, is provided at the bottom of the pump body.

15. The dual-purpose inflator pump according to claim 14, wherein the guiding groove is of an arc shape.

16. The dual-purpose inflator pump according to claim 14, wherein the valve train further comprises a positioning steel ball and a locking spring, a blind groove for accommodating the positioning steel ball and the locking spring is provided on the guiding column, a first end of the locking spring is connected to a bottom wall of the blind groove, a second end of the locking spring is connected to the positioning steel ball, an end of the positioning steel ball departing from the locking spring protrudes from the blind groove, and a positioning groove for clamping with the positioning steel ball is provided at a groove wall of the guiding groove.

* * * * *